Dec. 14, 1965  E. WELLER  3,223,014
PHOTOGRAPHIC SINGLE-LENS REFLEX CAMERA HAVING INTRA-LENS
SHUTTER PROVIDED WITH SWING-THROUGH BLADES
Filed Nov. 28, 1961  6 Sheets-Sheet 1

INVENTOR.
Erwin Weller
BY
Arthur A. March
ATTORNEY

Dec. 14, 1965 E. WELLER 3,223,014
PHOTOGRAPHIC SINGLE-LENS REFLEX CAMERA HAVING INTRA-LENS
SHUTTER PROVIDED WITH SWING-THROUGH BLADES
Filed Nov. 28, 1961 6 Sheets-Sheet 5

INVENTOR.
Erwin Weller
BY
Arthur A. March
ATTORNEY

INVENTOR.
Erwin Weller
BY
Arthur A. March
ATTORNEY

United States Patent Office 3,223,014
Patented Dec. 14, 1965

3,223,014
PHOTOGRAPHIC SINGLE-LENS REFLEX CAMERA HAVING INTRA-LENS SHUTTER PROVIDED WITH SWING-THROUGH BLADES
Erwin Weller, Calmbach (Enz), Germany, assignor to Alfred Gauthier, G.m.b.H., Calmbach (Enz), Germany, a corporation of Germany
Filed Nov. 28, 1961, Ser. No. 155,438
Claims priority, application Germany, Nov. 30, 1960, G 31,036
13 Claims. (Cl. 95—61)

This invention relates to photographic single-lens reflex cameras having intra-lens shutter assemblages provided with swing-through shutter blades which move in one direction of rotation during the running down of the drive mechanism, the said shutter blades being rotatably positioned in the intra-lens shutter housing and being driven by a spring-powered driving device and a shutter actuating mechanism which is drivingly connected with the said driving device.

One known type of photographic intra-lens shutter assemblage for single-lens reflex cameras has shutter blades which are carried by a carrier or supporting actuation ring rotatably arranged in the shutter housing and which is separate from the rotatable shutter driving ring, the latter having pin-and-slot connections with the blades. In this known arrangement, the construction and organization of the drive or control mechanism for the two rings is such that the one actuator or carrier ring, which serves as the support or bearing for the blades, is caused to rotate with respect to the other or blade-driving ring for the purpose of opening the blades to clear the path of light rays from the objective to the camera case prior to the effecting of the exposure, that is, for the purpose of being able to view the subject through the ray path with the mirror or reflex device. This construction requires, for the actual running down or carrying out of the exposure, that the shutter blades are opened and closed by a rotation of the driving ring while the said carrier or bearing ring remains still or fixed. Thus, these known intra-lens shutter assemblages for single-lens mirror or reflex cameras utilize, for the opening and closing movement of the shutter blades, an actuating system which for functional reasons requires two rings arranged to be rotatably positioned in the shutter housing, and requires that the movable carrier or bearing ring which mounts the shutter blades be locked after every rotary movement in order to absorb the kinetic forces which occur during the running down of the shutter drive mechanism and the carrying out of the exposure. The play or lost motion which exists between the engaging members of the locking mechanism which is required for this purpose, however, results in the bearing or carrier ring always having a small undesired movement notwithstanding its being locked, during the effecting of the exposure, and this has a speed-reducing effect on the movement of the shutter blades and the execution of the exposure. In addition, the above known type of shutter blade drive involves a costly construction employing structural members of complicated shape, as necessitated by the positioning or carrying of the shutter blades on the movable carrier ring and necessitated by the use of a locking or detent mechanism which is required for arresting or locking the said carrier ring.

Photographic shutters are also known, wherein the shutter blades are positioned on fixed or stationary pins and are driven by a driving ring which is arranged coaxially with respect to the shutter axis and has pin-and-slot connections with the shutter blades. However, the shutter blades in such construction are not of the swinging-through type having a single direction of rotation during the effecting of the exposure, but instead are of the type which are moved into the open and closed positions by a reciprocating movement, as the exposure is being effected.

An object of the present invention is to provide a novel and improved photographic intra-lens shutter construction in single-lens reflex cameras wherein the shutter blades swing or carry through in one direction of rotation during the running down of the blade driving mechanisms, which construction is appreciably simplified over prior structures, is easily understood and economical, and which effects an unobjectionable or advantageous carrying out of the exposure, even in the case of very short exposure times.

This is accomplished, in accordance with the invention, by arranging the driving device and the blade actuating mechanism as separate entities, and by providing between the said entities an unilateral or unidirectional driving connection which is operative while the shutter drive mechanism is running down from the cocked to the uncocked position, and by providing a single locking member which is movable under the action of a control device or automatic control mechanism and which will selectively hold the said actuating mechanism against movement in one direction from a position wherein the shutter blades are open, the said direction being opposite to the direction of movement which is effected by the running down of the driving device. This organization results in both a substantial structural simplification and also an improvement in the shutter blade drive, which has a favorable effect on the functional running down of the shutter drive mechanism, especially where short exposure times are involved. These advantages are due to the fact that, with the arrangement provided by the invention, it is possible, even in those shutters having shutter blades characterized by a swinging through movement (movement in one direction of rotation) during the running down of the shutter drive mechanism, to utilize fixed or stationary pivots or carrier means for the shutter blades, and to consequently drive them by means of a single driving ring. This, in turn, makes it possible to dispense with the carrier ring locking mechanism previously required in the above-mentioned known shutter blade drives, and also to dispense with the various structural members required to render operative such locking mechanism. In addition, there is now avoided or eliminated the undesirable additional movement or looseness of the shutter blade bearing or carrier means which previously had an adverse effect on the functional running down of the blade driving mechanism.

A further advantage is had in the above-described organization as provided by the invention, since it is now possible to move the shutter blades without the additional cost represented by the space-requiring and complicated structural members, from the finder or viewing position to the closed position which precedes the actual making of the exposure. This advantage is attained by arranging the blade actuating mechanism so that it is kept in engagement with the driving device, as by utilizing a spring biasing means for such actuating mechanism which is weaker than and opposes the driving of the shutter drive device.

For the purpose of causing the shutter blades to be immediately shifted into their open positions after the completion of the exposure and simultaneously with the replacement of the mirror into the ray path through the intra-lens shutter assemblage (that is, into the viewing position) so that the view through the finder of the camera is interrupted for only the short length of time required to effect the exposure, with single-lens reflex cameras having the present improved drive provided by the invention the driving device is constituted as two separate members, said members being relatively adjustable or movable by an automatic control means to render inoperative the unidirectional driving connection between the driving device and the shutter actuating mechanism. Such unilateral or unidirectional driving connection comprises a catch on one of the said two members of the driving device, which is cooperable with a counterpiece on the shutter blade actuating mechanism.

A further advantageous construction provided by the invention, which is saving of space and requires but few members involves utilizing the same automatic control mechanism for both moving the single locking member which acts on the shutter actuating mechanism and for separating or rendering inoperative the unilateral driving connection provided between the driving device on the one hand and the shutter actuating mechanism on the other hand.

Also, in accordance with the invention, the said single locking member may be constituted as a multi-armed lever, one arm of which serves as a control member and is provided for the purpose of rendering inoperative the said unilateral driving connection between the driving device and the shutter actuating mechanism. Such construction of the locking member provides the greatest possibility of functional dependability while effecting a simple and space-saving arrangement since a single movement of the locking member as initiated by the automatic control mechanism after the completion of the exposure, releases that part of the shutter actuating mechanism which cooperates with the said catch to enable such part to carry out a return or retrograde movement, while at the same time such single movement arrests or halts the said part of the shutter actuating mechanism in a specific position which results in the shutter blades being held open.

Another advantageous structure provided by the invention results when the said two members of the driving device are constituted as levers which are coaxial with each other and with the cocking axis of the shutter, one lever comprising a one-arm primary lever and the other or secondary, cooperable lever having the said catch at its free end and being shiftable in an axial direction with respect to the said primary lever.

For the purpose of establishing a positive, unilateral driving connection between the shutter actuating mechanism and the said secondary or driving lever, the said catch is arranged so that it projects into the path of movement of a crank which constitutes a part of the shutter actuating mechanism, said crank being also positioned coaxially with respect to the levers of the driving device.

In order to obtain a friction free, functional running down of the shutter drive mechanism which insures a dependable release or unlocking of the crank member of the shutter actuating mechanism, the free end of the secondary or driving member or lever is provided with a sloping or tapered portion which cooperates with one arm of the single locking member in such a manner that the latter lifts or shifts the driving member axially out of the path of movement of the crank, upon the locking member being swung into the locking position.

Further, the crank member may be provided with a deflector means or portion which, as the shutter is being cocked for the next exposure, shifts the driver lever of the driving device past the crank member.

Details of the invention will become apparent from the following specification and the drawings, which illustrate an embodiment of the subject matter of the invention, and in which:

FIGS. 2 and 4 are similar, and are referrable respectively to the showings of FIGS. 1 and 3.

Figure 1:
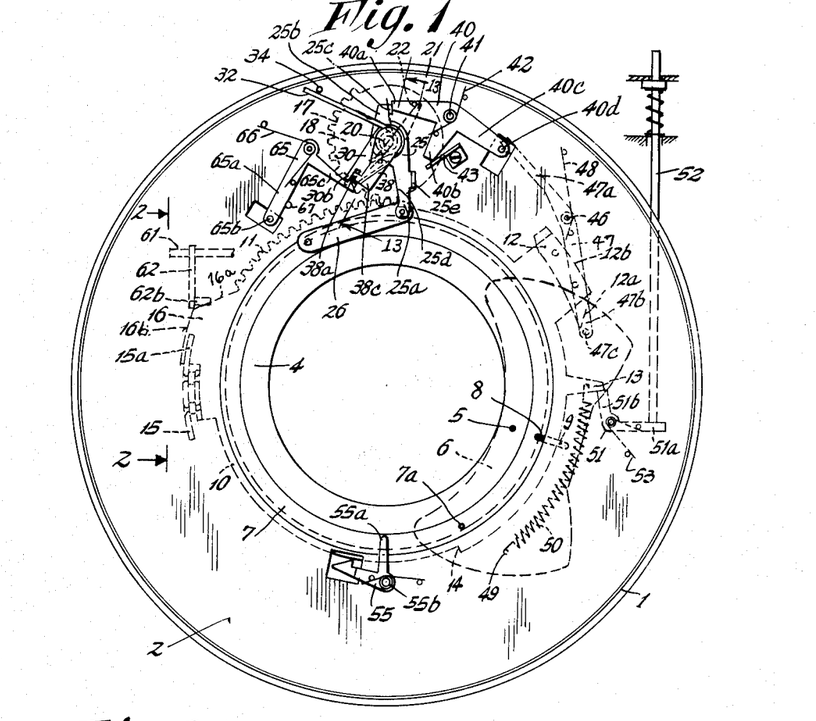
FIG. 1 is a fragmentary diagrammatic elevational view of the improved driving mechanism provided by the invention, as incorporated in an intra-lens shutter assemblage. The shutter is shown in the cocked condition, and the shutter blades are open.

Referring first to FIG. 1, the housing of the intra-lens shutter assemblage is indicated by the numeral 1. Arranged within the housing 1 in a well known manner is a base plate 2 which constitutes a carrier for the members of the shutter and drive mechanisms. Located at the rear of the base plate 2 on an annular attachment 4 and movable about fixed pins 5 are shutter blades 6, only one of which is shown for reasons of clarity of illustration. The blades 6 are constructed as "swing-through" blades. A shutter blade driving ring 7 is rotatably mounted on the rear of the base plate 2, being coaxial with the annular attachment 4, and pin-and-slot connections 8, 9 are provided between the driving ring 7 and the blades 6. Also arranged at the rear of the shutter housing 1 is a program ring 10 which has on its circumference, as may be seen in FIG. 1 when progressing in a clockwise direction, a first control cam 12, a stop and spring-supporting lug 13, and a shoulder 14 as well as second and third cams 15 and 16 respectively. The teeth 17 of a gear disc 18 engage teeth 11 of the program ring 10, said gear disc being loosely carried by an axle or shaft 20. A one-armed lever 21 is affixed to the shaft 20, said shaft being also called herein the "cocking shaft" of the shutter. The lever 21 is disposed in back of the gear disk 18 as viewed in FIG. 1, and engages a driver pin 22 provided on the disk 18 whereby it drives said disk in a counter-clockwise direction upon the shutter being cocked. The cocking shaft 20 also carries a rotatably mounted crank member 25, which is located in front of the disk as seen in FIG. 1, said crank member being advantageously constituted as a two-armed lever. One arm 25a of the crank member has a driving connection to the shutter blade driving ring 7 by means of a link 26, whereas the other arm 25b cooperates with the control portion of a locking member 40 to be described later.

A driving device which is positioned on the cocking shaft 20 serves (as may be especially seen in FIGS. 1, 3, 5, 7, 9, 11 and 13) to drive the shutter actuating mechanism, the latter comprising essentially the shutter blade driving ring 7, the crank member 25 and the link 26. The said driving device comprises a simple primary lever or arm 30 which is cooperable with and positively (tensionally) connected to the lever 21 and which has a radially extending recess or slot 30a. In addition, the arm or primary lever 30 has at one side a pin 31 which is engaged by one end of a coil spring 32 carried by the cocking shaft 20. The coil spring 32 is constructed, arranged and supported with respect to a fixed pin 34 of the shutter housing 1 that a driving movement is always exerted on the lever or arm 30, which tends to rotate the same in a counterclockwise direction. Another but weaker coil spring 36, advantageously also mounted on the cocking shaft 20, is associated with the spring 32. One end of the spring 36 engages the pin 31 of the lever 30 and the other end engages a tab or lug 25c on the crank arm 25b, tending to rotate the crank member 25 in a clockwise direction.

The other member or secondary lever 38 of the driving device (hereinafter also referred to as the driver member or lever), is rotatably positioned on the cocking shaft 20 directly adjacent the lever 30 to cooperate with the latter. For this purpose, the driver member or lever 38 has at its free end a catch or lug 38a which extends at a right angle and passes through the slot 30a of the lever 30 so as to establish a cooperable driving connection between the said two levers. As far as the catch 38a in particular is concerned, the same is made of sufficient length, for functional reasons, to project into the path of movement of the crank member 25 and to thereby engage under certain conditions the stop edge 25d of the crank member 25. As is especially apparent from FIG. 13, a sloping tab or lug 38b is provided on the free end of the driver lever 38, said tab having an oblique deflecting edge 38c which ascends radially from the inside to the outside and which in turn cooperates with the previously mentioned locking member 40. The said member 40 at the same time serves as a stop member for the crank member 25.

The locking member or lever 40 has three arms 40a, 40b and 40c, and is rotatably mounted on the base plate 2 of the shutter housing by means of a pin 41. In addition, the locking lever 40 is acted on by a coil spring 42 which tends to rotate it in a counterclockwise direction. While the approximately tangentially extending arm 40a of the locking lever 40 is assigned the task of holding the crank member 25 in its starting position when the lever is in the cocked state, the radially inwardly extending arm 40b serves the purpose of lifting or shifting the catch 38a of the driver member 38 out of the path of movement of the crank member 25. In effecting this latter, the arm 40b acts under the influence of the spring 42 (for a specific position of the driving device 30, 38) on the oblique deflecting edge 38c. A limiting stop 43 provided on the base plate 2 of the housing has the purpose of limiting the deflecting movement of the locking member 40.

The remaining arm 40c of the locking member cooperates with a two-armed control lever 47 which is pivotally positioned on a pivot pin 46. For the purpose of effecting such cooperation, a pin 40d is provided on the free end of one arm 40c of the locking member 40, the said pin 40d serving as an abutment for engagement by the arm 47a of the control lever 47. The lever 47 is acted on by a coil spring 48, being biased in a counter-clockwise direction. The other arm 47b of the control lever 47 has a cam follower or sensing pin 47c with the aid of which the first cam 12 (which is affixed to the program ring 10) is sensed. The construction and arrangement of the said first control cam 12 with its obliquely extending ride-up edge 12a is such that the control lever 47 is pivotally shifted, during a rotation of the program ring 10 in a clockwise direction, about the pivot pin 46 to an extent sufficient to enable the pin 47c to reach the range of the circular arc-shaped guide edge 12b of the first cam 12.

As has been already indicated and is especially apparent from FIG. 1, the program ring 10 is equipped with a radially extending stop and spring supporting lug 13 which is acted on by a tension spring 50 anchored at one end to the base plate 2 of the shutter housing 1 by means of a pin 49. Also cooperating with the lug 13 is a bell crank or knee lever 51 which is rotatably positioned on the base plate 2, one arm 51a of such bell crank being actuatable by a camera release member 52 as shown. The other arm 51b of the lever 51 engages the stop lug 13 and prevents the program ring 10 from carrying out a rotary motion until such time as the lever 51 is pivoted out of the path of movement of the lug 13 against the action of its coil spring 53, as by actuation of the camera release member 52.

In order to obtain a stepped or gradual running down of the program ring 10, as conditioned for functional reasons and controlled in response to the movement of the shutter blade driving ring 7, a holding pawl 55 is provided, shaped like a bell crank, said pawl being rotatably positioned on the base plate 2 in the intra-lens shutter housing, in accordance with the invention. During the running down of the program ring 10 in a clockwise direction, the said holding pawl engages the locking shoulder 14 of the ring. The pawl 55 is shifted out of such engagement by a rotary movement of the shutter blade driving ring 7 which takes place at a certain interval. This is done or effected by the position of a driving pin 7a which is mounted on the driving ring 7, such pin impinging on the arm 55a of the pawl 55 during the running down movement of the shutter blade driving ring. This impingement pivots the pawl 55 about its bearing pin 55b whereby the program ring 10 is released for a further rotary clockwise movement.

Figures 2, 13:
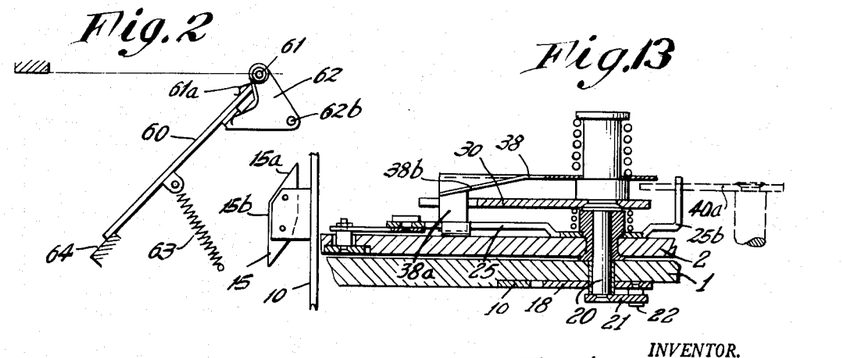
FIG. 2 is a diagrammatic representation of the viewing mirror and associated parts of the camera, the mirror being shown in the viewing or ray-blocking position which it occupies when the shutter mechanism is cocked as in FIG. 1.
FIG. 13 is a fragmentary axial sectional view through the members of the driving device and shutter actuating mechanism, such section being taken on the line 13—13 of FIG. 1.

It is further apparent from FIGS. 1 and 2 that, in addition to the first control cam 12, two additional cam pieces 15 and 16 are provided on the program ring 10. One of these two, the cam piece 15 is designated as the second control cam and serves to shift the reflex mirror 60 (which is diagrammatically indicated in FIGS. 2, 4, 6, 8 and 10) into and out of the ray path of the camera. In order to displace the mirror 60, which is pivotally mounted on an axis 61 extending transversely with respect to the axis of the objective or lens assemblage (or transevrsely to the ray path of the camera) the said shaft 61 carries at least one actuating lever 62. The lever 62, as with the mirror 60, is at one of its ends appropriately affixed to the pivotal axis or shaft 61 and at its other end is supported at the bottom surface of the mirror. The actuating lever 62 is retained in engagement with the mirror 60 by a coil spring 61a which is mounted on the shaft 61. The actuating lever 62, in turn, has a guide pin 62b on which the slightly curved second cam 15 impinges, by means of its oblique edge 15a, during the running down of the program ring 10. This lifts the mirror 60 against the action of a light tension spring 63 from its support 64 and moves it into a horizontal position, as shown for example in FIGS. 8 and 10. It will be noted from FIGS. 2, 4, 6, 8 and 10 that the cam 15 has a rhombic shape, in the illustrated embodiment of the invention. The movement of the mirror 60 to the horizontal position effects a closing of the light shaft which is located above it, and at the same time releases or opens the ray path from the objective (lens) of the camera to the plane of the film.

The cam piece 16 which is operative as the third control cam, is also fixedly connected to the program ring 10 and has a radially obliquely ascending ride-up edge 16a, as well as a guiding edge 16b constructed in the shape of an arc of a circle. The said third cam 16 cooperates with a two-armed release lever 65 which latter is positioned on the base plate 2 of the shutter housing and has for such purpose, a sensing or cam follower pin 65b on one arm 65b which faces the third cam. The other arm 65c of the release lever 65 is constructed as a detent or pawl. The construction and arrangement of the release lever 65 are such that the arm 65c which serves as the pawl is able to pivot, under the action of a spring 66, into the path of movement of the driving device 30, 38 and is able to hold the same in cocked position by engaging the projecting end 30b. In order to position the release lever 65 a stop pin 67 is provided on the base plate 2, against which the arm 65a of the lever cam abut in its end position.

Figures 3, 4:
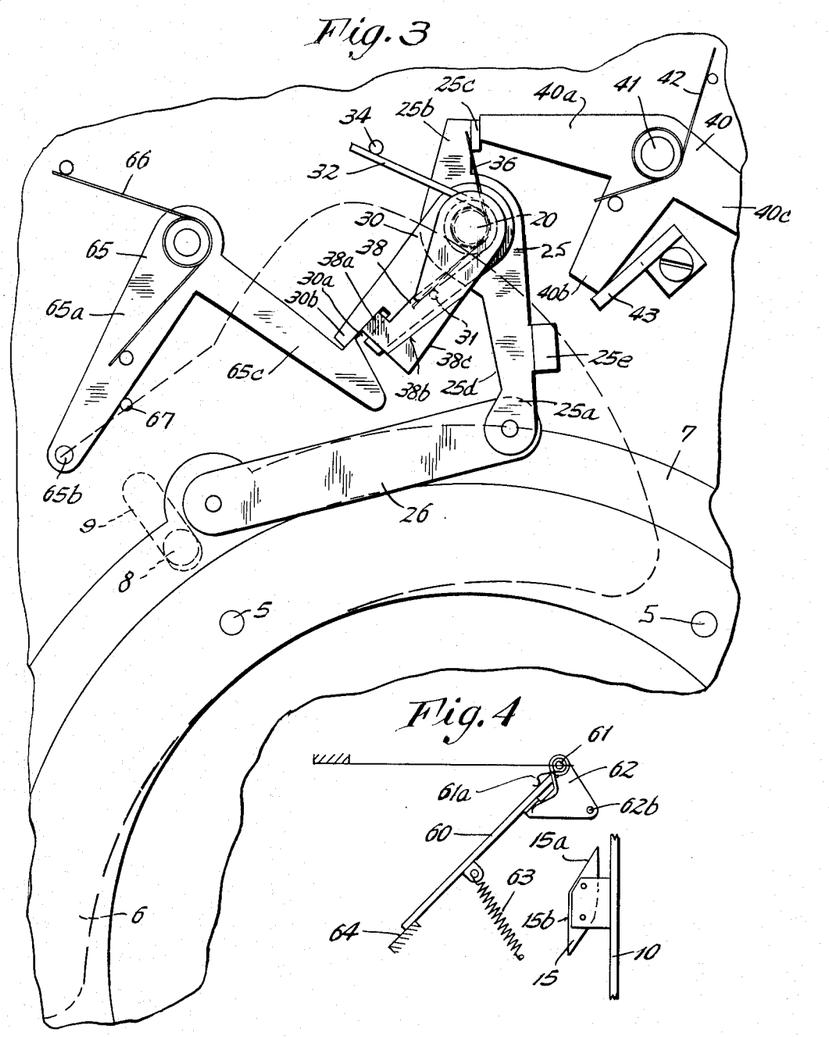
FIG. 3 is an enlarged fragmentary elevational view of the driving device and shutter-actuating mechanism as provided by the invention, such view being on an enlarged scale and the components having the same positions as those illustrated in FIG. 1.
FIG. 4 is a diagrammatic representation of the viewing mirror and associated parts, illustrating the positions which these occupy when the components of the driving device and shutter-actuating mechanism have the positions shown in FIG. 3.
Figures 5, 6:
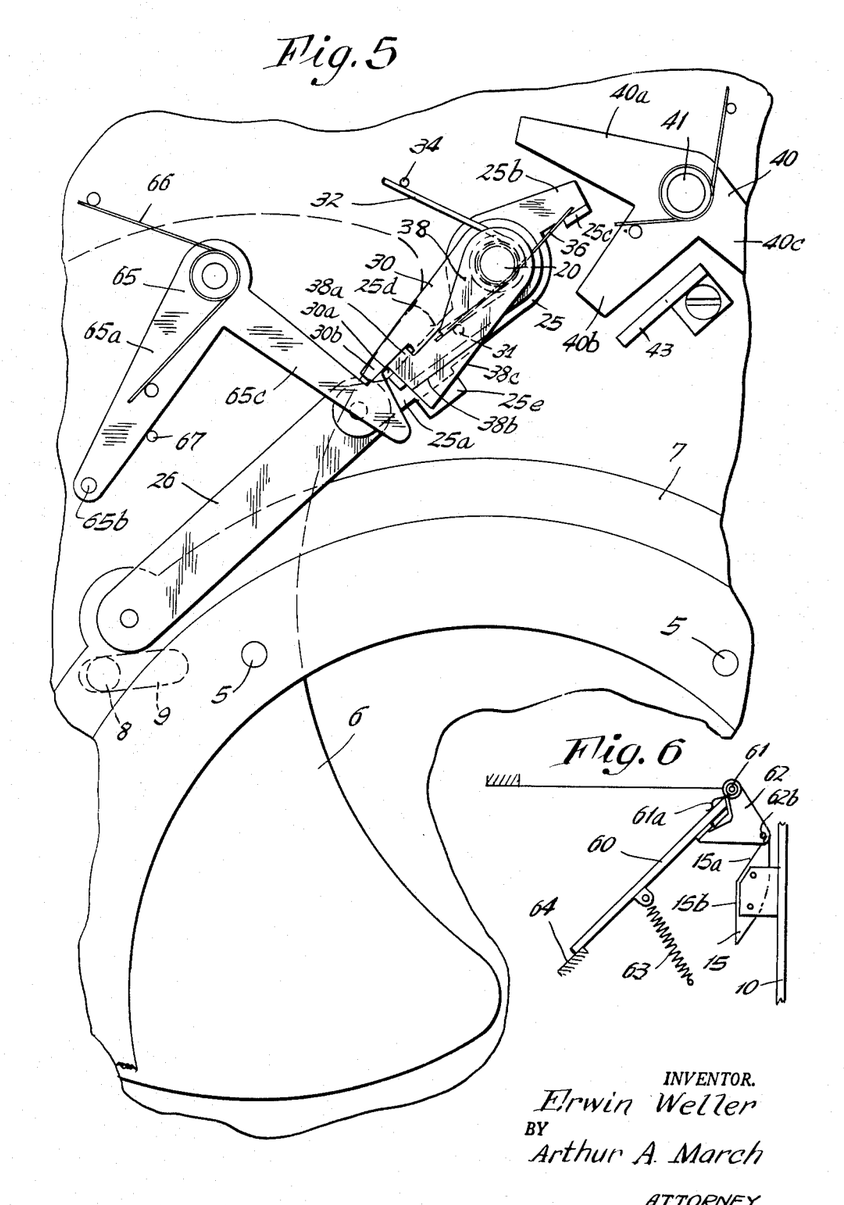
FIG. 5 is a view similar to that of FIG. 3 with the shutter still cocked, but with the crank member of the shutter actuating mechanism having been shifted whereby such mechanism has effected a closing of the shutter blades. The viewing mirror has not yet been shifted.
FIG. 6 is a diagrammatic representation of the viewing mirror and associated parts, which is referrable to and corresponds with the positions of the components shown in FIG. 5.
Figures 7, 8:
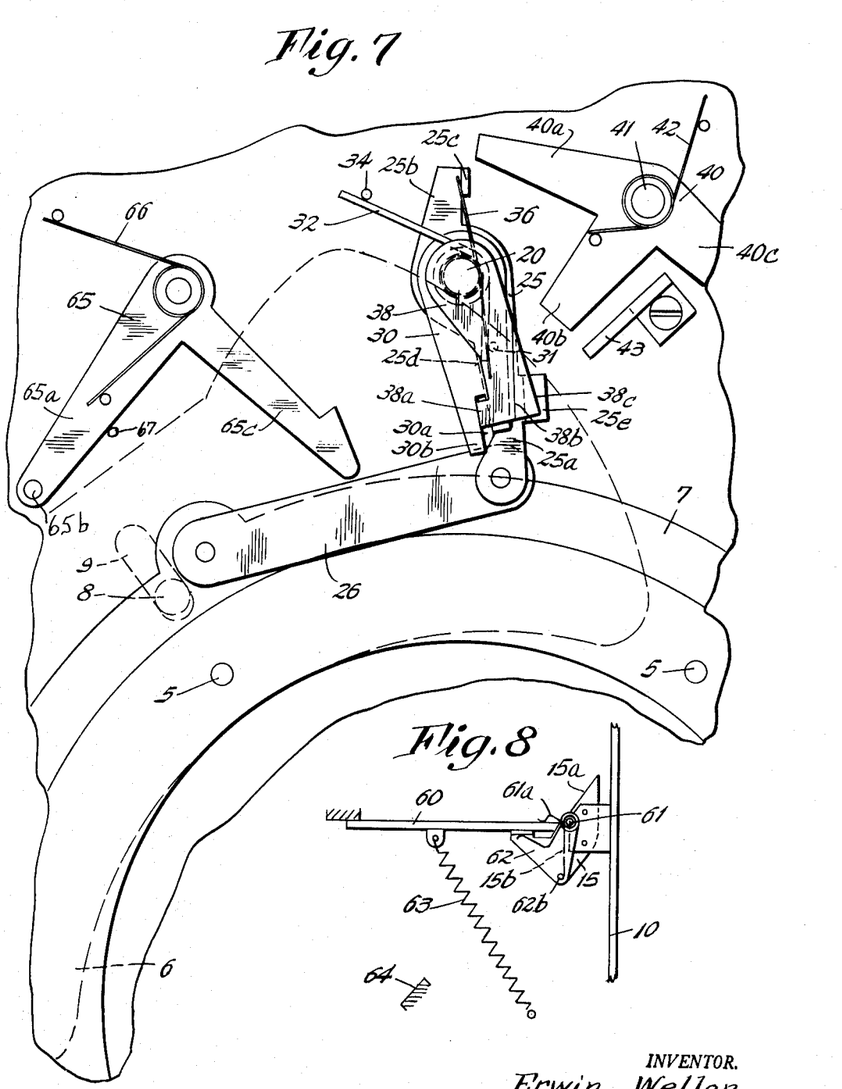
FIG. 7 is a view like FIGS. 3 and 5, but showing an intermediate position of the shutter driving and blade actuating mechanism during running down of the drive, the shutter blades being now fully open and the mirror being in its exposure position (having been shifted from the viewing position).
FIG. 8 is a diagrammatic representation of the viewing mirror in the exposure position, such position corresponding to the conditions illustrated in FIG. 7.
Figures 9, 10:
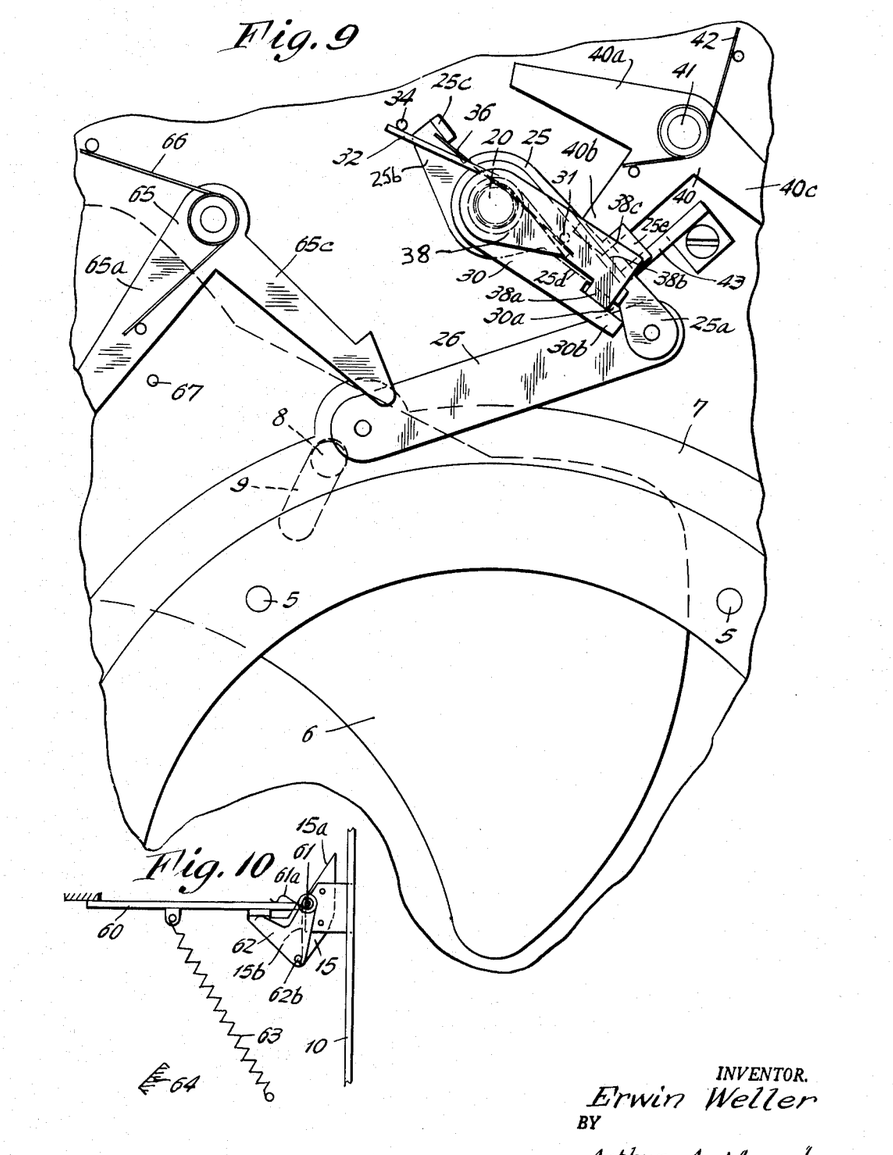
FIG. 9 is a view similar to that of FIGS. 3, 5 and 7 but showing another position of the shutter drive and blade actuating mechanisms, such as occurs after termination of the exposure. The shutter blades are closed again and the viewing mirror still occupies the exposure position.
FIG. 10 is a diagrammatic representation of the viewing mirror in the exposure position, corresponding to the condition illustrated in FIG. 9.

The mode of operation of the above described device is as follows:

By operating a well known cocking element of the camera (as for example the film transport device which is not shown in the drawing and which acts on the ratchet wheel or disk 18) the movable members of the shutter assemblage are shifted into the positions illustrated in FIGS. 1 and 3, whereby the mirror 60 of the camera maintains the already existing oblique reflex position shown in FIG. 2, making it possible to look through the finder and to see the object which is to be photographed. In addition, both the coil springs 32 and 36 of the driving device 30, 38 for effecting the rotating movement of the shutter blade 6, as well as the tension spring 50 of the program ring 10 are fully cocked (under full tension or stress) whereas the driving device 30, 38 is kept in the cocked position by the release lever 65. The shutter blades 6 are located outside of the ray path of the objective, so that the mirror 60 is able to reflect the image of the object to be photographed into the finder of the camera.

If the program ring 10 is now released for running down movement, as by actuation of the camera release member 52, (which causes a pivoting of the arresting lever 51) the program ring 10 will shift in a clockwise direction under the action of the tension spring 50. Due to this movement, the control lever 47 is pivoted by the oblique ride-up edge 12a of the first cam 12 as the latter moves against the follower pin 47c, such shifting causing the other arm 47a of the lever to press on the pin 40d of the arm 40c of the locking member 40 associated therewith. The latter is then pivoted in a clockwise direction by this pressure. The movement of the locking member 40 is terminated as soon as the follower pin 47c of the control lever 47 slides from the obliquely ascending ride-up edge 12a onto the control edge 12b having the shape of the arc of a circle. The arm 40a of the locking lever 40, which has so far served as a stop for the crank member 25, is thereby pivoted out of the range of movement of the crank arm 25b of the crank member, and the latter is released for its running down movement. Under the action of the spring 36, the crank member 25 of the shutter actuating mechanism comprising the components 7, 25, 26 now runs down in a clockwise direction and shifts the shutter blades 6 into their closed position. These positions are reached when the stop or abutting edge 25d of the crank member 25 impinges on the catch 38a of the driver lever 38, occupying the position shown in FIG. 5.

When the shutter blades 6 are thus closed, the program ring 10 has already rotated during its first phase of movement to such an extent that the second cam 15 engages the sensing pin of cam follower 62b of the actuating lever 62 and pivots the mirror 60 upward, which means that the light shaft at the top of the camera is now closed, and that the ray path in the camera is opened, up to the point of the closed shutter blades 6.

In the further course of the rotary clockwise movement of the program ring 10, the third control cam 16 moves toward the release lever 65, lifting the same by means of the oblique, ride-up edge 16a and thus releases the driving device 30, 38 to carry out a pivoting movement in a counterclockwise direction.

Immediately after this occurs, the first phase of movement of the program ring 10 is terminated by impingement of the edge 14 thereof on the locking bolt 55, thus temporarily retaining the program ring in the said halted position.

In the meantime, the released spring-urged driving device 30, 38 swings in the counter-clockwise direction, driving ahead of it the crank member 25 of the shutter actuating mechanism. This movement of the crank member 25, bringing about the exposure, pivots the shutter blades 6 about the bearing pins 5 in one movement from the closed positions of the blade through the open positions shown in FIG. 7 and again into the closed positions. For the latter, the driving device 30, 38 and the shutter blade actuating mechanism occupy the positions shown in FIG. 9.

Figures 11, 12:
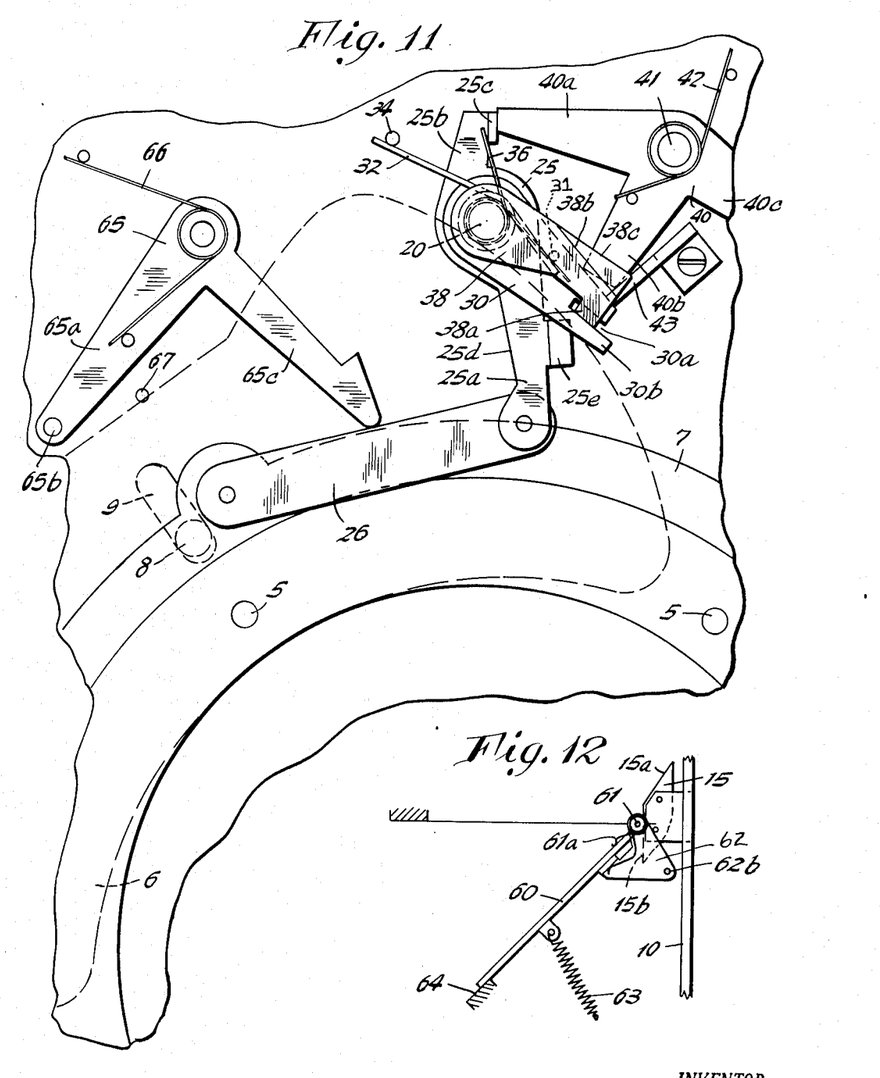
FIG. 11 is a view similar to that of FIGS. 3, 5, 7 and 9 but showing the shutter drive and blade actuating mechanisms in the end positions occupied by these after completion of the exposure. The viewing mirror has been shifted to the viewing position wherein it closes the ray path.
FIG. 12 is a diagrammatic representation of the mirror and associated components, illustrating the viewing position corresponding to the condition illustrated in FIG. 11, the mirror now again closing the ray path through the intra-lens shutter assemblage.

The pin 7a which is provided on the shutter blade driving ring 7 and which impinges on the lever arm 55a of the arresting lever 55 shortly before the driving ring 7 reaches the end position, releases the program ring 10 whereupon said ring continues to carry out its temporary interrupted rotary movement. At the start of the second phase of movement, the program ring 10 shifts the second cam 15 thereof beyond the cam follower pin 62b of the actuating lever 62 which is holding the mirror in the horizontal position, so that the pin 62b slides off the outer end of the control edge 15b. This enables the actuating lever 62 as well as the mirror 60 to return to the viewing position under the influence of the tension spring 63, as shown in FIG. 12.

In the further course of the rotary movement of the program ring 10, the cam follower pin 47c of the control lever 47 also moves beyond the outer end of the first control cam 12, and this has the result that the pressure, which has so far been exerted by the control lever 47 on the arm 40c of the arresting lever 40 which is associated with the lever 47, no longer exists. This occurs because the control lever 47 is now deprived of the cam support, and the coil spring 42 associated with the locking member 40 is substantially stronger than the spring 48 of the control lever 47. This action, in turn, has the result that the arm 40b of the locking member 40, being driven by the comparatively strong coil spring 42 of the member 40 now engages and comes between the primary lever 30 and the secondary or driver lever 38 as the control lever 47 is simultaneously lifted or shifted away. Due to the impingement of the arm 40b on the oblique deflecting edge 38b, the catch 38a which is provided on the driver lever 38 is lifted out of the range of movement of the crank member 25 and the said member is thereby released and under the action of its spring 36 carries out a rotary movement in a clockwise direction. The shutter blades 6 move again to their open positions, which are reached when the arm 25b of the crank member 25, as is apparent from FIG. 11, again engages the arm 40a of the control lever 40 and comes to a standstill.

Upon a subsequent renewed cocking of the shutter, the projecting arm 21 of the primary lever or member 30 is driven in a clockwise direction by the gear wheel 18 and driver pin 22, during which operation the catch 38a of the driver lever 38 is shifted over and past the crank member 25. This is accomplished in a simple manner, by the provision of an obliquely extending deflector means or lug 25e which is provided on the crank member 25 and is located in the path of movement of the catch 38a, the latter being able to slide yieldingly over the deflecting member or tab 25e.

During the subsequent cocking process, the program ring 10 is simultaneously carried along in a counterclockwise direction by the gear disk 18. Since neither the mirror 60 nor the shutter blades 6 are to be moved during the cocking, and since the mirror should remain in the viewing or open position, the first cam 12 is so arranged that the follower pin 47c of the control lever 47 slides, during such subsequent cocking process, along its innner edge whereby the arm 47a is slightly lifted off or shifted away from the locking member 40. In a similar manner, the second cam 15 is also shifted past the follower pin 62b of the mirror actuating lever 62, said pin sliding along the rear edge of the second cam 15. Upon the return of the program ring 10, both the control lever 47 and the actuating lever 62 are slightly lifted off of the members which are functionally associated with them, such as the mirror 60 and the locking member 40, in order to make sure that the follower pins 62b and 47c, after sliding off of their respective cams 15 and 12, attain a position which dependably ensures a renewed driving engagement of the pins by the obliquely ascending ride-up edges of the cams.

I claim:
1. A photographic single lens reflex camera comprising
 (a) an intra-lens shutter housing,
 (b) a shutter means including a series of shutter blades for movement between open and closed positions thereof,
 (c) a shutter drive means including a spring means for biasing said drive means in the cocked position thereof,
 (d) means for cocking said shutter drive means,
 (e) a shutter-actuating means connected to said shutter means to effect the operation thereof,
 (f) a spring means for biasing said shutter actuating means, said latter spring means being weaker than said spring means biasing said drive means,
 (g) a unidirectional driving connection between said shutter drive means and shutter actuating means operative during the exposure rundown of said blades,
 (h) locking means acting on said shutter actuating means to resist the bias of said spring means biasing said shutter actuating means,
 (i) control means for effecting the release of said locking means,
 (j) a powered programming means operatively connected to said control means for sequencing the operation of said shutter blades,
 (k) said locking means including means to effect disengagement of said movable members of said unidirectional driving connection between shutter drive means and shutter actuating means whereby the latter automatically moves the blades to their open position after the running down of the exposure has taken place.

2. A camera as in claim 1, wherein:
 (a) the driving device comprises two separate relatively movable members,
 (b) the unilateral driving connection comprises a catch on a driver one of the members of the driving device and a cooperable counterpiece of the said shutter-actuating mechanism, and
 (c) there are automatic means for shifting the said one driver member having the catch to render inoperative said driving connection.

3. A camera as in claim 2, wherein:
 (a) the automatic means for shifting the said one driver member of the driving device is responsive to operation of the said control mechanism.

4. A camera as in claim 2, wherein:
 (a) there is a shutter cocking spindle in the shutter housing,
 (b) the two members of the driving device comprise levers coaxial with each other and with the said cocking spindle, and
 (c) the lever comprising the said one driver member is shiftable in an axial direction with respect to the other member.

5. A photographic single-lens reflex camera comprising:
 (a) an intra-lens shutter housing,
 (b) a shutter means including a series of shutter blades for movement between open and closed positions thereof,
 (c) a shutter drive means including a spring means for biasing said drive means in the cocked position thereof,
 (d) means for cocking said drive means,
 (e) a shutter actuating means connected to said shutter means to effect the operation thereof,
 (f) a spring means for biasing said shutter-actuating means,
 (g) a unidirectional driving connection between said shutter drive means and shutter-actuating means operative during the exposure rundown of said blades,
 (h) locking means acting on said shutter-actuating means to resist the bias of said spring means biasing said shutter-actuating means,
 (i) control means for effecting the release of said locking means,
 (j) a powered programming means for sequencing the operation of said shutter blades,
 (k) said locking means including means to effect disengagement of said unidirectional driving connection between said shutter drive means and shutter-actuating means whereby the latter automatically moves the blades to their open position after the running down of the exposure has taken place,
 (l) the drive means comprising two separate relatively movable members, and
 (m) the unilateral driving connection comprising a catch on one of said members of the drive means and a cooperable counterpiece of said actuating mechanism,
 (n) automatic means for shifting said one driver member having the catch to render inoperative said driving connection, and
 (o) said automatic means for shifting said one driver member of the drive means being responsive to the operation of the said control mechanism wherein:
 (p) said automatic means for shifting the said one driver member of the driving device includes a lever arm, and
 (q) the said lever arm and the said locking member comprise parts of a single, multi-armed lever.

6. A photographic single lens reflex camera comprising:
 (a) an intra-lens shutter housing,
 (b) a shutter means including a series of shutter blades for movement between open and closed positions thereof,
 (c) a shutter drive means including a spring means for biasing said drive means in the cocked position thereof,
 (d) means for cocking said drive means,
 (e) a shutter actuating means connected to said shutter means to effect the operation thereof, (f) a spring means for biasing said shutter actuating means,
(g) a unidirectional driving connection between said shutter drive means and shutter-actuating means operative during the exposure rundown of said blades,
(h) locking means acting on said shutter actuating means to resist the bias of said spring means biasing said shutter actuating means,
(i) control means for effecting the release of said locking means,
(j) a powered programming means for sequencing the operation of said shutter blades,
(k) said locking means including means to effect disengagement of said unidirectional driving connection between said shutter drive means and shutter actuating means whereby the latter automatically moves the blades to their open position after the running down of the exposure has taken place,
(l) the drive means comprising two separate relatively movable members, and
(m) the unilateral driving connection comprising a catch on one of said members of the drive means and a cooperable counterpiece of said actuating mechanism, and
(n) automatic means for shifting said one driver member having the catch to render inoperative said driving connection, wherein:
(o) the shutter-actuating mechanism includes a crank member having a pivotal axis which is coaxial with the two members of the driving device and with the cocking spindle,
(p) the said counterpiece is carried by the crank member, and
(q) the said catch is normally disposed in the path of movement of said counterpiece.

7. A camera as in claim 6, wherein:
(a) the driver member has a sloping portion,
(b) the automatic means for shifting the driver member has an arm cooperable with the sloping portion of the driver member to shift the catch thereof out of the path of movement of the crank member, said sloping portion and cooperable arm comprising the said means for shifting the driving member.

8. A camera as in claim 7, wherein:
(a) the crank member has deflector means for shifting the driver member, during cocking of the shutter, to enable the catch thereof to clear the crank member and move past the same.

9. A photographic single lens reflex camera comprising
(a) an intra-lens shutter housing,
(b) a shutter means including a ring means and series of shutter blades operatively connected to said ring means for movement between open and closed positions,
(c) a shutter drive means including a spring means for biasing said drive means in the cocked position thereof,
(d) means for cocking said shutter drive means,
(e) a shutter-actuating means connected to said shutter means to effect the operation thereof,
(f) a spring means for biasing said shutter actuating means, said spring means of the shutter drive means being stronger than the spring means of said shutter actuating means,
(g) locking means acting on said shutter actuating means to resist the bias of said spring means biasing said shutter actuating means,
(h) control means for effecting the release of said lock- means, and
(i) a programming means for sequencing the operation of said shutter blades, and
(j) means for automatically moving said shutter blades to their open position after the running down of the exposure has taken place.

10. A photographic single lens reflex camera comprising
(a) an intra-lens shutter housing,
(b) a shutter means including a series of shutter blades for movement between open and closed positions thereof,
(c) a shutter drive means including a pair of cooperating drivingly connected movable members and spring means for biasing said drive means in the cocked position thereof,
(d) means for cocking said shutter drive means,
(e) shutter-actuating means connected to said shutter means to effect the operation thereof,
(f) a spring means for biasing said shutter actuating means, said spring means of the shutter drive means being stronger than the spring means of said shutter actuating means,
(g) a unidirectional driving connection between said shutter drive means and shutter-actuating means rendered operative during the exposure run down of said shutter means, said connection including two relatively movable members,
(h) locking means acting on said shutter actuating means to resist the bias of said spring means biasing said shutter actuating means,
(i) a programming means for sequencing the operation of said shutter blades, and
(j) means for automatically effecting the disengagement of said relatively movable member of said unidirectional driving connection between said shutter drive means and said shutter actuating means after the running down of the exposure has taken place whereby said shutter acting means moves said blades to their open position.

11. In a photographic single lens reflex camera having a reflex mirror which is adapted to be shifted into and out of the ray path of the camera, the improvement of
(a) an intra-lens shutter means including a series of shutter blades and a driving ring operatively connecting said blades for movement between open and closed position,
(b) a shutter drive means including a primary lever and a secondary lever, means effecting a cooperable driving connection therebetween, said driving connection including a catch connected to the secondary lever receivable in a slot of the primary lever,
(c) a spring means for biasing said drive means in the cocked position thereof,
(d) means for cocking said shutter drive means, said cocking means including a cocking release lever for restraining said drive means against the bias of its spring means in the cocked position thereof,
(e) a shutter-actuating means including a two-armed crank lever, a link operatively connected between one of said arms and said shutter driving ring to effect the operation of the shutter blades,
(f) spring means for biasing said shutter actuating means,
(g) said driving means spring being stronger than the shutter actuating spring,
(h) a unidirectional driving connection between said shutter drive means and shutter actuating means rendered operative during the exposure run down of said shutter blades, said connection including two relatively movable members,
(i) locking means acting on said shutter-actuating means to resist the bias of the spring means biasing the shutter actuating means,
(j) means for programming the coordinate movement of said shutter blades and reflex mirror operatively associated in said camera upon the release of said locking means, and
(k) means on said locking means to effect disengagement of said relatively movable members of said unidirectional drive means so that said shutter actuating means automatically returns the blades to their open position upon completion of the exposure run down.

12. A photographic single lens reflex camera comprising
 (a) a reflex mirror adapted to be shifted into and out of the ray path of the camera,
 (b) an intra-lens shutter means operatively associated with said reflex mirror for coordinate movement therewith,
 (c) said shutter means including a shutter ring and a plurality of pivotally mounted swing-through shutter blades connected to said ring,
 (d) a shutter drive means including a spring means for biasing the same in the cocked position thereof,
 (e) a shutter-actuating means operatively connected to said shutter means to effect the operation thereof,
 (f) spring means for biasing said shutter actuating means, said latter spring means being weaker than said spring means biasing said drive means,
 (g) means for effecting the release of said shutter actuating means for effecting initial movement of said shutter blades from open to closed position,
 (h) means for effecting a one way drive connection between said driving means and said shutter actuating means to effect the exposure run down of said shutter blades upon the initial closing of said shutter blades, said one way drive connection including a pair of relatively movable members connected to effect a unidirectional drive
 (i) means for automatically effecting disengagement of said pair of relatively movable members of said one way drive means between said shutter drive means and said shutter actuating means upon the completion of exposure run down of said blades,
 (j) said shutter actuating spring means automatically biasing said shutter actuating means to effect return of said shutter blades to their inital open position upon completion of the exposure run down,
 (k) and means for automatically programming the operation of said shutter actuating means and drive means to effect coordinate shifting of said blades between open and closed position with the movement of said reflex mirror into and out of the ray path.

13. A photographic single-lens reflex camera comprising
 (a) a reflex mirror adapted to be shifted into and out of the ray path of the camera,
 (b) an operatively associated intra-lens shutter means,
 (c) said shutter means including a rotatably mounted driving ring and a plurality of swing-through blades pivotally mounted thereon,
 (d) a shutter-actuating means for effecting operation of said shutter means,
 (e) said actuating means including a pivotally mounted crank lever and a link operatively connecting said crank lever and said drive ring,
 (f) a spring means biasing said crank lever,
 (g) a shutter drive means including a pair of driving connected drive levers,
 (h) a second spring means biasing said shutter drive levers in the cocked position thereof, said second spring being stronger than said first mentioned spring means,
 (i) a release lever for maintaining said pair of levers cocked against the bias of said second spring means in the cocked position of said shutter means,
 (j) a locking lever for resisting the bias of said spring operating on said crank lever of said shutter actuating means,
 (k) a control lever acting on said locking lever for effecting the release of said locking lever,
 (l) a programming means including a ring and a drive spring for driving said programming ring,
 (m) a camera release means for holding said programming ring against the bias of its drive spring,
 (n) said programming ring including means for effecting actuation of said control lever to effect release of said shutter actuating means to initially move said shutter blades to their closed position, means to shift said reflex mirror out of the ray path of said camera means to release said release lever to effect exposure run down of said shutter drive means,
 (o) unidirection driving means including a pair of relatively movable cooperating levers between said shutter drive means and shutter actuating means to effect the exposure run down of the shutter blades, said reflex mirror being retained out of the ray path of said camera during said exposure run down,
 (p) means for interrupting the run down of said programming means during the exposure run down of the shutter blades,
 (q) means for effecting the release of said programming ring upon completion of the shutter exposure run down to continue the run down of said programming ring to return said reflex mirror into the ray path of said camera, and
 (r) means on said locking member to disengage the driving connection between said shutter drive means and said shutter actuating means whereby said actuating shutter spring means automatically returns said blades to open position upon completion of said shutter exposure run down.

References Cited by the Examiner

UNITED STATES PATENTS

| | | | |
|---|---|---|---|
| 1,963,107 | 6/1934 | Walters | 95—42 |
| 2,410,629 | 11/1946 | Carroll | 95—63 |
| 2,412,673 | 12/1946 | Carroll | 95—63 |
| 2,412,681 | 12/1946 | Fuerst | 95—63 |
| 2,718,835 | 9/1955 | Fuerst | 95—63 |
| 2,730,025 | 1/1956 | Faulhaber | 95—42 X |
| 2,980,004 | 4/1961 | Prentice | 95—63 |
| 3,005,394 | 10/1961 | Schulze | 95—42 |
| 3,014,418 | 12/1961 | Hahn | 95—63 |
| 3,062,118 | 11/1962 | Starp | 95—42 |
| 3,074,333 | 1/1963 | Hahn | 95—42 |

JOHN M. HORAN, *Primary Examiner.*

NORTON ANSHER, *Examiner.*